March 6, 1928.
C. T. McGILL
BASE EXCHANGE WATER SOFTENER AND FILTER AND FILL NOZZLE SALT POT ATTACHMENT
Filed April 9, 1926
1,661,488
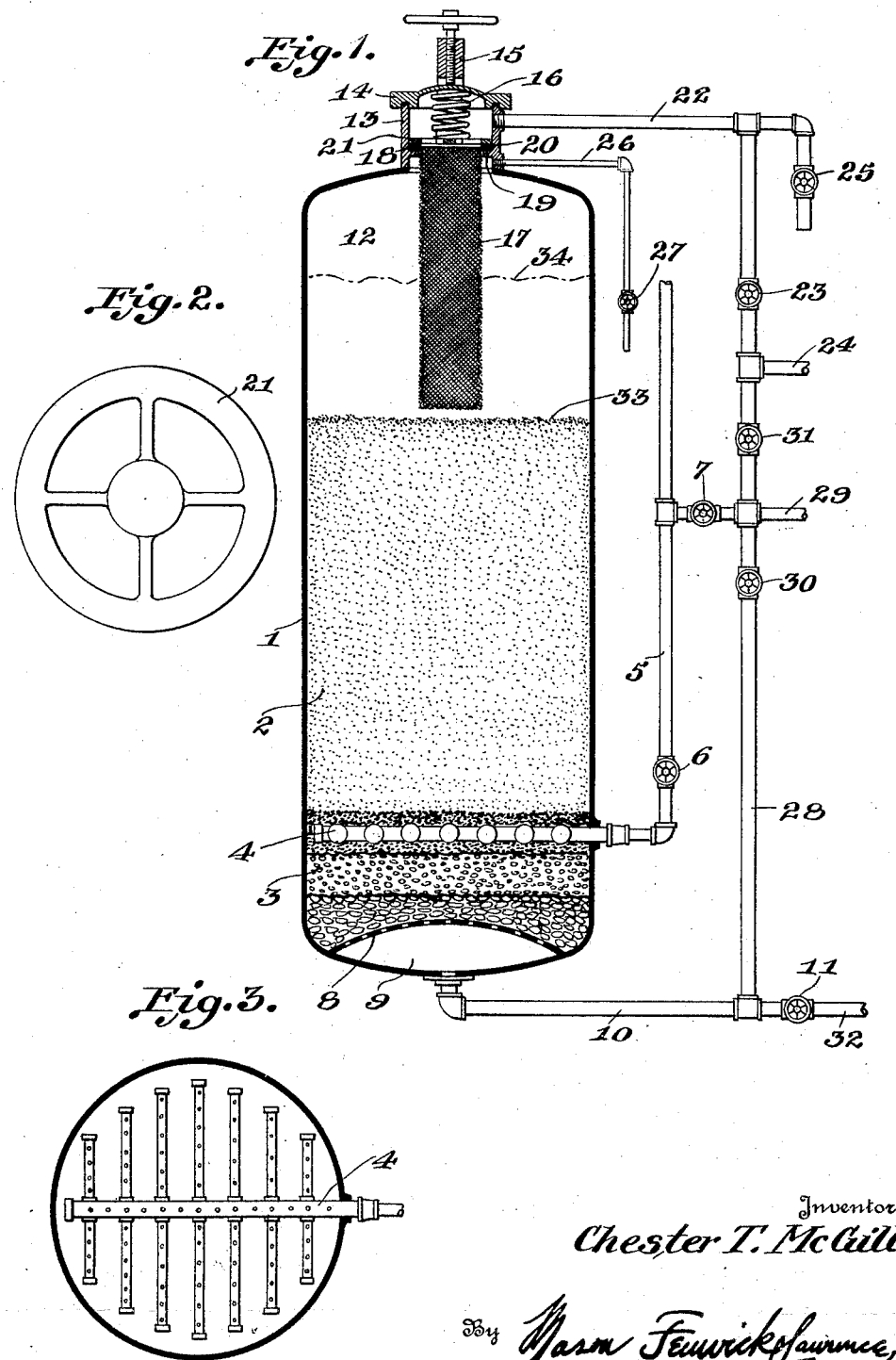

Patented Mar. 6, 1928.

1,661,488

UNITED STATES PATENT OFFICE.

CHESTER T. McGILL, OF ELGIN, ILLINOIS, ASSIGNOR TO REITER COMPANY, OF ELGIN, ILLINOIS, A CORPORATION OF ILLINOIS.

BASE-EXCHANGE WATER SOFTENER AND FILTER AND FILL-NOZZLE SALT-POT ATTACHMENT.

Application filed April 9, 1926. Serial No. 101,002.

This invention relates to base exchange water softeners and particularly to improvements in the fill nozzle and salt pot attachment devices.

An object of this invention is to provide a combination fill nozzle and salt pot which may be readily attached in combination to a base exchange water softener at a suitable point therein.

A further object of this invention is to provided a base exchange water softener in combination with a filter arrangement for accomplishing the filtering of the raw water supply before it enters into the base exchange mineral and to furnish the filtered unsoftened water for drinking or other purposes.

Another object of this invention is to provide means whereby the filtering material such as gravel, quartz and sand may be backwashed without disturbing or interfering with the softening portion of the equipment.

One of the prime objects of this invention is to provide a means for backwashing of the filtering material which will prevent the packing of the softening material thereby obviating, to a large extent, the objectionable feature of channelling.

This invention provides particularly, means for filtering the water used in ordinary flushing purposes in lavatories, thereby eliminating the need of the use of soft water for this purpose and reducing expenses accordingly.

The provision of a combination fill nozzle and salt pot attachment in this invention accomplishes the filtering of the softened water and eliminating any fines being carried out with the softened water, it also provides a receptacle to receive the salt and to receive water for dissolving the salt into the brine and distributing it throughout the top portion of the base exchange mineral.

Further objects of this invention will appear from the following detailed description and as disclosed in the single sheet of drawings which are herewith made a part of this application:

In the drawings,

Fig. 1 illustrates a vertical sectional view of a base exchange water softener showing a combination therewith, perforated manifold, screen basket, hold-down rings and gaskets for carrying the basket, together with a resilient spring for holding the basket in position.

Fig. 2, represents a top plan view of the screen basket disclosing the holding rings thereon.

Fig. 3, is a plan view of the manifold adapted to be located in a suitable position within the base exchange water softener, preferably in the filtering material.

Numeral 1 designates a tank adapted to contain suitable base exchange mineral 2 for water softening purposes, the mineral 2 being positioned upon any suitable filtering material 3 within the tank 1. Suitably located within the filtering material 3 is a perforated manifold 4, for the purpose of receiving the filtered water which is carried to the hard water filter lines, and for the purpose of receiving and distributing the raw unfiltered water required in backwashing the filter material, the manifold 4 is adapted to be properly connected in open communication with a pipe line 5 and valve 6 and 7. At a suitable position near the bottom of the tank 1, is located a perforated plate 8, for the purpose of carrying the gravel, quartz, sand and other filtering material and also for the purpose of distributing the water within the filtering material, below the plate 8, is a water chamber 9 adapted to receive through a suitable line connection 10 the raw water to be filtered or softened and also the back wash water in backwashing the filtering material before regenerating the softener, the said backwash and regenerating water is carried to the drain 32 through line 10 and valve 11.

Above the base exchange mineral 2 within the tank 1 is a free board space 12, and suitably positioned, preferably at the top of the tank 1 with a combination fill nozzle, a salt pot attachment, comprising a housing 13, a cover 14, an adjusting yoke 15 for the purpose of holding the cover down, a tension spring 16 adapted to resiliently hold a screen basket 17, within the housing 13, by means of a flanged portion 18 on the basket 17, the flange portion being adapted to rest on suitably placed shoulder portions 19, preferably integrally connected with housing 13, on the inside thereof, the flange portions 18 being held in interlocked relationship with the shoulder portions 19, by means of a gasket 20, and a holddown ring 21, the holddown ring being adapted to be held under suitable tension by means of the tension spring 16. Leading from the fill nozzle housing 13, is a line 22, which in operation carries the soft water down from valve 23, and into the soft water line 24. Line 22, also in regeneration carries the sediment from salt pot chamber 17 to drain 25.

Leading from surface blow down line 26, is adapted to extend from the salt pot housing 13, to the point below the top of the screen basket 17, for the purpose of draining to waste, any sediment or impurities that get by the filtering materials and are washed loose from the base exchange mineral during regenerating, this is accomplished by opening valve 27.

On line 10 an extension 28 is adapted to be connected to the raw water supply 29 through valve 30 between the raw water line 29 and soft water outlet 24 is located a valve 31 and suitable connections.

In operation this base exchange water softener and filter provides means for admitting the raw water through line 29, valve 30, lines 28 and 10 to the softener tank 1 into the water chamber 9 through the perforated plate 8, filtering material 3 through the base exchange mineral 2, free board space 12, into the screen basket 17, which filters the softened water and eliminates any fines from being carried out from the fill nozzle casing 13, through the lines 22, valve 23 and soft water line 24.

During operation, valves 31, 7, 27, 25 and 11, are closed, all other valves being opened, namely, 6, 30 and 23. In operation the manifold plate 4, provides a means for carrying filtered water into the hard water filter lines 5. This filtered hard water may be utilized for the purpose of flushing lavatories and the like instead of the common practice of raw, unfiltered water being used which always causes unsanitary conditions through the precipitation of sediment, mud, and temporary hardness that is liberated from the water due to the ordinary temperature of hot rooms. These impurities also cause the flushing apparatus to become partially out of order, in other words, the sediment and scum accumulates around the float and keeps the valve float from properly seating, thereby allowing a trinkling of the water to continue through the stool and requiring the tripping of the flush valve often many times before getting the valve to properly seat.

The manifold plate 4, also functions to furnish unsoftened filtered water for drinking purposes and the like which provides a more healthy water for the family table or other purposes. In backwashing filtering material between regenerating periods, or when the softener is in operation, to rid the filtering material of the accumulation of sediment or vegetable matter, close valve 30, valves 7 and 11 are opened, this allows the raw water supply to pass through valve 7, line 5 and valve 6 into the manifold 4 and distributes water in the top portion of the filtering material, quartz and sand, washing the suspended sediment through the filter material 3, distributing plate 8 and water space 9, into line 10 through valve 11 to the drain 32. The manifold plate 4 also functions to provide raw unfiltered water for requirements of the softener section during the period of backwashing filter material.

In operation, the screen basket 17 functions to filter the softened water and to prevent the fine mineral from being carried from the free board space 12, into the soft water line 22, hence to the surface line 24. When functioning in this manner, the base exchange material tends to rise up along the sides of the screen basket 17 into the free board space 12, as at 34. At intervals when the soft water is not required, the mineral resides back to its normal position 33, in the tank 1, which is at the bottom portion of the screen basket 17.

In regeneration, the screen basket 17 will function to accommodate the salt, at which time, the valves 6, 30, and 23, are closed, valves 7, 11 and 31 are opened. To insert the salt, the cap 14 is removed and the salt admitted into the basket 17 and the cap 14 is replaced and screwed down tight by means of yoke 15, valve 23 is opened. This allows the raw water to enter through line 22 into the top portion of fill nozzle 13, and into the salt in the screen basket 17, gradually dissolving the salt into a solution and spraying it over the entire top bed of the mineral 2. Owing to the mesh of the screen basket 17, the brine solution is forced through the interstices giving a spraying effect in the free board space 12 in all directions gradually carrying the brine solution well distributed down through the top portion of the base exchange mineral 2; this brine solution passes downwardly through the base exchange mineral to the filter material 3, space 9, line 10, to the waste drain 32, at the rate of one to two gallons per minute, this is accomplished by regulating the flow through valve 11.

This operation of brining requires from 20 to 30 minutes, during this time, all the brine has been dissolved in the screen basket 17, and carried down through the mineral through the waste 32. Then valves 11 and 23 are closed, valve 30 is opened and valve 25 is opened partially, to allow a rate of flow of from one to three gallons of water a minute. This carries the raw water supply through lines 28 and 10 into the water chamber 9 up through the perforated plate 8, the filtering material 3 and base exchange mineral 2 through screen 17, and carrying any sediment lodged in the screen 17, through the brining process up through line 22, and out at valve 25. When the water becomes soft and clear at valve 25, the softener and filter is again ready to put in operation. Close valves 25, 7 and 31, open valves 6, and 23, and the softener is again in service.

The screen basket 17 of this invention may be easily removed during regenerating period for the purpose of cleaning, other than what can be cleaned by backwashing in regenerating. It is found by experiment, that there is a certain amount of scum that adheres to the outer edge of the screen basket 17, which should be properly scalded, washed and brushed off at intervals of at least two or three times a year.

When the softener tank is emptied of water with valve 25 open to the drain, and opening valve 30 wide, allows the pressure to force in very rapidly through the filtering material, throwing the base exchange mineral up against the top of the softener tank 1 and screen 17, thereby breaking up any channels or packed material.

The screen basket 17 in this invention may be utilized as a measuring device for the amount of salt needed for brining in the regeneration process. A suitable size screen basket may be designed for softeners of different capacities; when the basket is full of salt, it will hold the correct amount of salt required to regenerate the bed of base exchange material.

In the process of softening water by this invention, the normal level of the base exchange mineral 2, will be at 33, and during the operation when soft water is being drawn from the line 24, normal height of the mineral will range between the top of the tank 1 and the normal bed line 33 to approximately the indicated line 34.

What I claim is:

1. In a water softener, a tank, base exchange mineral within the tank, filtering material within the tank, means for introducing water into the tank, means for filtering the water, means for supplying filtered unsoftened water, means for washing the filtering material and supplying softened water at the same time, there being a free board space above the base exchange mineral within the tank, a screen basket extending into the free board space from a fill nozzle.

2. In a water softener, a tank, base exchange mineral within the tank, filtering material within the tank, means for introducing water into the tank, means for filtering the water, a manifold adapted to supply filtered unsoftened water, means for supplying filtered softened water, means for washing the filtering material without passing the water through the base exchange mineral, there being a free board space above the base exchange mineral within the tank, a screen basket extending into the free board space from the fill nozzle, salt means within the screen basket for regenerating the base exchange mineral, means for dissolving the salt gradually into a brine solution and means for spraying the brine solution through the screen basket uniformly over and down through the base exchange mineral to the waste drain.

3. In a base exchange water softener having a fill nozzle, a salt pot attachment within the nozzle extending a suitable distance into the nozzle, comprising a screen basket, having fine interstices thereby preventing the loss of the fines during the softening operation, and means for removing the screen basket from the fill nozzle consisting of a detachable cap portion on the fill nozzle, whereby the screen basket may be easily removed for cleaning and replaced at regenerating periods.

4. In a base exchange water softener having a fill nozzle, a salt pot attachment located within the fill nozzle extending a suitable distance into the softener, a base exchange mineral and filtering material, means for introducing water into the softener to pass through the filtering material without passing through the mineral, consisting of a manifold positioned within the softener adapted to provide means for washing the filtering material while the softener is in operation.

5. In a base exchange water softener, a fill nozzle, a salt pot attachment within the fill nozzle comprising a fine mesh screen basket extending inwardly of the softener for keeping the fines from being carried out with the soft water, a base exchange mineral within the softener, the screen basket extending approximately to the normal level of the base exchange mineral, detachable resilient means for holding the screen basket within the nozzle.

6. In a base exchange water softener, a tank, a base exchange mineral and filtering material, means for introducing water into the tank to pass through the filtering material without passing through the exchange mineral consisting of a manifold positioned within the tank.

7. In a base exchange water softener, a tank, a base exchange mineral and filtering material, means for supplying unsoftened filtered water and washing the filtering material while the softener is in operation, consisting of a manifold positioned within the tank.

8. In a base exchange water softener, comprising a tank, a base exchange mineral and filtering material, means for introducing water into the tank for washing the filtering material without passing through the base exchange mineral.

9. In a base exchange water softener, comprising a tank, a base exchange mineral and filtering material, means for introducing water into the tank for washing the filtering material without passing through the base exchange mineral, means for eliminating waste of base exchange mineral during the regenerating periods.

10. In a base exchange water softener, comprising a tank, a base exchange mineral and filtering material, means for introducing water into the tank for washing the filtering material without passing through the base exchange mineral, means for eliminating waste of base exchange mineral during the regenerating periods, consisting of a screen basket in the fill nozzle with interstices finer than the exchange mineral.

In testimony whereof I affix my signature.

CHESTER T. McGILL.